United States Patent
Yamaguchi

Patent Number: 6,020,866
Date of Patent: Feb. 1, 2000

[54] METHOD AND DISPLAY PANEL FOR DISPLAYING COLOR IMAGE

[75] Inventor: Chiseki Yamaguchi, Tokyo, Japan

[73] Assignee: NEC Corporation, Tokyo, Japan

[21] Appl. No.: 08/756,819

[22] Filed: Nov. 26, 1996

Related U.S. Application Data

[62] Division of application No. 08/544,205, Oct. 17, 1995, Pat. No. 5,616,416.

[30] Foreign Application Priority Data

Oct. 17, 1994 [JP] Japan .................................. 6-250854

[51] Int. Cl.$^7$ ...................................................... G09G 3/34
[52] U.S. Cl. ........................ 345/86; 488/411.1; 488/420; 488/692; 488/913; 488/195; 349/20; 349/23
[58] Field of Search ..................... 345/102, 106, 345/107, 86; 428/411.1, 692, 913, 195, 420; 367/68, 70; 313/504; 349/20, 104, 94, 187, 21, 23, 112; 359/288, 289

[56] References Cited

U.S. PATENT DOCUMENTS

| | | | |
|---|---|---|---|
| 3,438,022 | 4/1969 | Teeg et al. | 345/106 |
| 3,670,323 | 6/1972 | Sobel et al. | 350/160 |
| 3,700,802 | 10/1972 | Makrkin et al. | 348/84 |
| 4,750,003 | 6/1988 | Terashima et al. | 346/74.2 |
| 4,884,146 | 11/1989 | Yatsunami | 358/400 |
| 4,902,592 | 2/1990 | Matsumura et al. | 349/187 |
| 5,105,185 | 4/1992 | Nakanowatari et al. | 340/784 |
| 5,144,464 | 9/1992 | Ohnishi et al. | 359/98 |
| 5,274,460 | 12/1993 | Yamada et al. | 358/296 |
| 5,276,380 | 1/1994 | Tang | 313/504 |
| 5,285,298 | 2/1994 | Kaneko et al. | 359/43 |
| 5,294,869 | 3/1994 | Tang et al. | 313/504 |
| 5,294,870 | 3/1994 | Tang et al. | 313/504 |
| 5,337,186 | 8/1994 | Oikawa et al. | 359/628 |
| 5,353,135 | 10/1994 | Edwards | 359/55 |
| 5,402,141 | 3/1995 | Haim et al. | 345/88 |
| 5,513,028 | 4/1996 | Sono et al. | 349/139 |
| 5,548,425 | 8/1996 | Adachi et al. | 359/69 |
| 5,550,659 | 8/1996 | Fujieda et al. | 359/54 |
| 5,614,290 | 3/1997 | Yamaguchi | 428/195 |
| 5,650,867 | 7/1997 | Kojima et al. | 349/104 |

FOREIGN PATENT DOCUMENTS

| | | |
|---|---|---|
| 59-229578 | 12/1984 | Japan . |
| 64-33536 | 2/1989 | Japan . |
| 2-28625 | 1/1990 | Japan . |

*Primary Examiner*—Dennis-Doon Chow
*Attorney, Agent, or Firm*—Sughrue, Mion, Zinn, Macpeak & Seas, PLLC

[57] ABSTRACT

A color image is displayed by using a display panel with a color pattern layer which is formed on one side of a transparent substrate and has, for example, three separate sets of transparent pixel areas in red, green and blue colors which constitute a regularly repetitive pattern and a set of opaque band-like areas by which each pixel area is bordered. The display panel further comprises, usually on the opposite side of the substrate, either a thermal recording layer which exhibits reversible changes in transmittance with temperature or a magnetic recording layer which contains flaky particles of a ferromagnetic metal dispersed in a polymer and exhibits reversible changes in transmittance with orientations of the flaky particles. To display an image, the thermal recording layer is heated in areas opposite to selected pixel areas of the color pattern layer, or a magnetic field parallel to or perpendicular to the display panel is applied to the magnetic recording layer in areas opposite to selected pixel areas, and then the display panel is back-lighted.

17 Claims, 6 Drawing Sheets

METHOD AND DISPLAY PANEL FOR DISPLAYING COLOR IMAGE

This is a divisional of application Ser. No. 08/544,205 filed Oct. 17, 1995 now U.S. Pat. No. 5,616,416.

BACKGROUND OF THE INVENTION

This invention relates to a method of displaying a color image based on image information in the form of electrical signals and a display panel for use in the method of the invention. The display panel has a transparent color pattern layer divided into pixel areas and a recording layer which exhibits reversible changes in transmittance by external stimulus.

For displaying the outputs of computers, facsimiles, scanners, etc., it is common to use an electrically driven display apparatus such as CRTs, liquid crystal displays, plasma displays and LED displays. A common advantage of these displays is that they require no mechanically movable parts. However, these displays are not well suited for displaying still images for long hours, and these displays become very costly when the screen size is enlarged.

There are some proposals for displaying images on a photosensitive or dielectric sheet in the form of a belt by the selective application of a coloring substance such as a powder toner to the photosensitive or dielectric sheet. By this method it will be relatively easy to produce wide-screen display apparatus or to display still images. However, there are several problems with the method incorporating a photosensitive or dielectric sheet such as the high cost of processing the photosensitive belt, the unstable running of the belt, the insufficient durability of the belt, and the difficulty in displaying color images and darkness of the display screen.

In addition, there are proposals for a display apparatus using a magnetic coloring substance in the pixels to display images by selective inversion or migration of the magnetic substance. However, such an apparatus is not suited for the display of color images and also suffers from a dark screen.

JP 59-229578 A shows a different method for displaying color images. The method uses an insulating sheet, in the form of a belt, as the display screen base. In addition, three sets of pixels in three different colors, such as red, green and blue, are formed on the insulating sheet so as to make a color pattern such as a mosaic pattern or a striped pattern. Each pixel is provided with an electrode. While the display screen is moved, a voltage is selectively applied between the electrodes in the pixels and a number of needle-like electrodes fixed opposite to the display screen in order to electrically charge selected pixels. Then the charged pixels are hidden by a toner, so that the unhidden pixels form a color image.

The method of JP 59-229578 A has several problems. It entails high cost and it is difficult to form the pixels having electrodes. It is not easy to realize accurate alignment of the pixels in the moving display screen and the fixed needle-like electrodes. The display screen in the form of a belt is liable to deteriorate or become dusty by repeated driving. The adhesion of toner to the pixels is unfavorable for color reproducibility and durability of the display screen.

JP 64-33536 A shows an electrochromic display apparatus having an electrochromic display layer, a set of electrodes to selectively heat the pixel areas of the electrochromic layer and another set of electrodes to selectively apply a voltage to the pixel areas to cause coloration or vanishing. This apparatus also has disadvantages such as the high cost of implementing two electrodes for the individual pixels, complications associated with the control of coloration and banishing, the questions about reliability, the difficulty in reducing the individual pixel sizes for high resolution image reproduction, the low contrast of the displayed images and the inability to display image properly at night or at dark locations.

JP 2-28625 A shows a thermochromic display apparatus having a thermochromic display layer, a thermal head for selectively heating pixel areas of the thermochromic layer to cause coloration and a cooling element for vanishing. This apparatus becomes very costly mainly due to the inclusion of a cooling element and a driving circuit for the cooling element. In addition the apparatus will not properly reproduce color, and contrast of the displayed images and the ability to display images under dark conditions will be poor.

SUMMARY OF THE INVENTION

It is an object of the present invention to provide a method for displaying a color image on a display panel having a color pattern layer divided into pixel areas, the method being simple in principle, easy to employ in practical applications and capable of displaying clear color images even under dark conditions.

It is another object of the invention to provide an image display panel for use in the method according to the invention.

An image displaying method according to the invention uses a display panel which comprises a transparent substrate, a color pattern layer which is formed on one side of the substrate and has a multiplicity of transparent pixel areas consisting of at least two separate sets of pixel areas in different colors which constitute a regularly repetitive pattern and a set of regularly arranged opaque band-like areas by which each pixel area is bordered, and a recording layer which is formed on the substrate to lie parallel to the color pattern layer and exhibits reversible changes in transmittance by application of external stimulus. The method comprises the steps of selectively applying an external stimulus to the recording layer of the display panel to change the transmittance of the recording layer in areas opposite to selected pixel areas of the color pattern layer, and backlighting the display panel from a selected side.

When the backlighted display panel is viewed from the opposite side, light passing through the transparent pixel areas opposite to the high-transmittance areas of the recording layer provides a color image.

In this invention the material of the recording layer of the display panel is either a thermal recording material which exhibits reversible changes in transmittance with temperature or a magnetic recording material which comprises flaky particles of a ferromagentic metal dispersed in a transparent polymer and exhibits reversible changes in transmittance with orientations of the flaky particles. The particles may be confined in microcapsules.

As to the color pattern layer of the display panel, it is preferred to form red, green and blue pixel areas (all these pixel areas are transparent as mentioned above) each of which is a rectangular area bordered by black lines.

This invention is suited to display of still images and has advantages in many respects.

A display panel according to the invention can easily be fabricated at relatively low cost because the display panel is simple in construction and has no electrodes, and it is easy to produce large-sized display panels. Maintenance and replacement of the display panel are also easy. The bordering of the transparent pixel areas by opaque lines relaxes the precision requirement for the formation of the color pattern and for the scanning of the recording layer with a recording head. The opaque border lines the quality of displayed images with respect to sharpness and color reproduction.

In the displaying method no coloring substance (e.g. toner) is applied to the display panel, and the method uses no expendable materials. Therefore the operating cost is very low, and the display panel is hardly soiled.

In this invention color images of good quality can be displayed by a simple process consisting of the selective application of heat or magnetic fields to the recording layer of the display panel and backlighting the display panel. It is possible to continue displaying a color image for a long period of time by merely continuing backlighting. If desired the image can be made to vanish temporarily by simply turning off the backlight. It is possible to display clear color images even at night or at dark locations.

DESCRIPTION OF THE PREFERRED EMBODIMENTS

Figure 1:
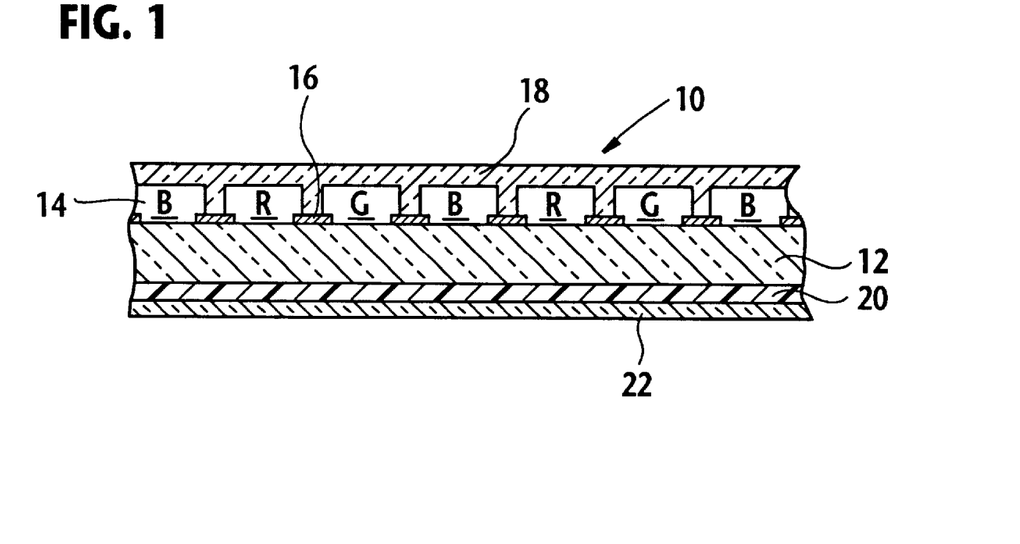
FIG. 1 is cross-sectional view of a portion of a display panel according to the invention.
Figure 2:
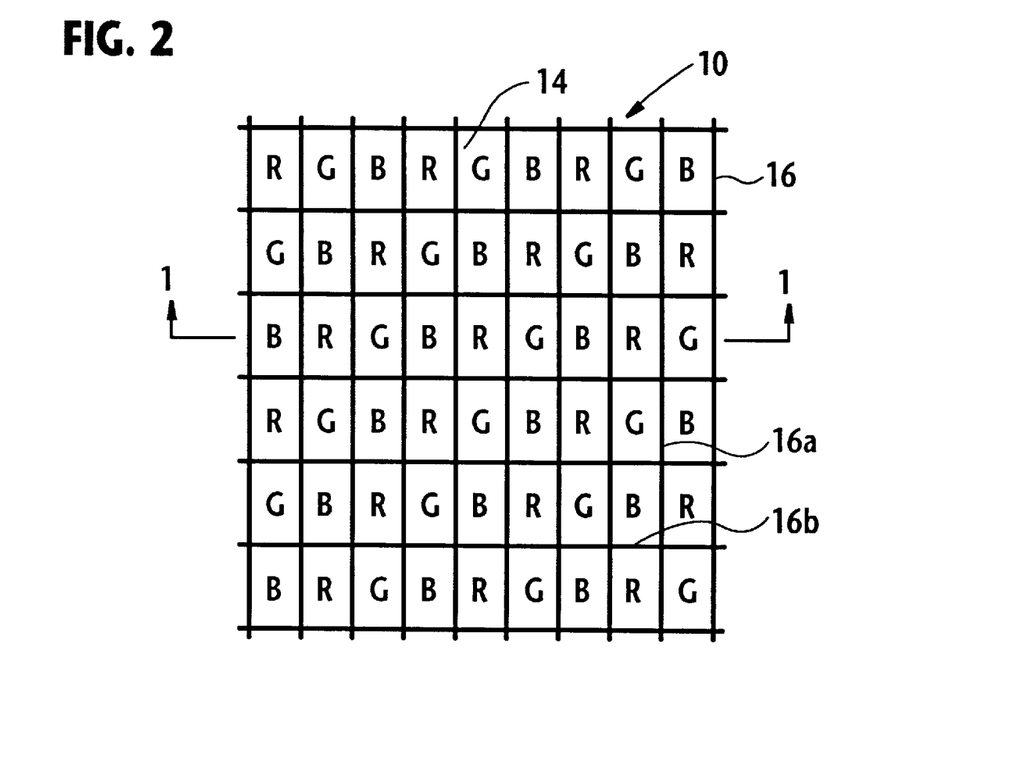
FIG. 2 shows an example of the color pattern of the pixels in the display unit of FIG. 1.

FIG. 1 shows the construction of an embodiment of a display panel according to the invention. The display panel 10 has a transparent glass substrate 12, and a color pattern layer 14 formed on one side of the glass substrate. The color pattern layer 14 is divided into a great number of transparent color areas consisting of red color areas R, green color areas G and blue color areas B by a lattice of opaque, black lines 16. That is, each of these color areas R, G, B is bordered by the black lines 16. The three sets of color areas R, G and B are distributed so as to make a regularly repetitive pattern of the three colors. As shown in FIG. 2, in this example the color areas R, G, B are rectangular areas arranged in a mosaic pattern. For example, each of these color areas R, G, B is from about 80 $\mu$m to about 200 $\mu$m in length and width, and the spacings between adjacent color areas are from about 30 $\mu$m to about 50 $\mu$m. In this example, each color area is 150 $\mu$m in length and 80 $\mu$m in width. The color pattern layer 14 including the black border lines 16 is overlaid with a transparent protective layer 18.

The color pattern layer 14 can be formed by a conventional technique in which color coatings are formed on a glass sheet. For example, organic dyes or pigments are applied useing a dying process, dispersing process, printing process or eLectrodeposition process. Additionally, coatings are made in the manner of an interferential multilayer coating. If necessary it is possible to employ a combination of two or more different techniques.

On the opposite side of the glass substrate 12 there is a thermal recording layer 20 formed of a heat-sensitive material that exhibits changes in transmittance with temperature. For example, the heat-sensitive material is a dispersion of a saturated higher fatty acid such as stearic acid in a thermoplastic resin such as poly(vinyl chloride) resin. The thermal recording layer 20 is overlaid with a thin (usually about 10 $\mu$m or thinner), protective layer 22 formed of a transparent synthetic resin such as, for example, polyethylene or polyethylene terephthalate (PETP).

The material of the transparent substrate 12 is not limited to glass. A transparent and weatherable synthetic resin such as PETP may also be used.

A color image is displayed on the display panel 10 in the following way.

Figure 3:
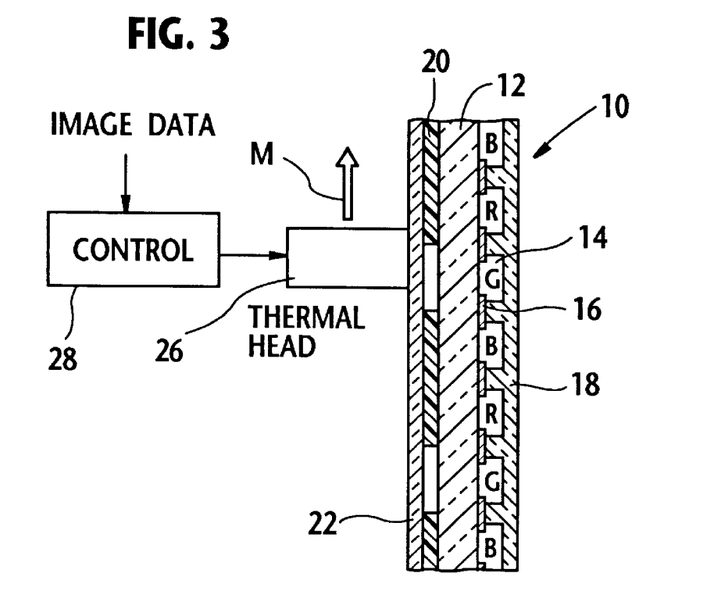
FIGS. 3 and 4 illustrate a process of displaying a color image on the display panel of FIG. 1.

Referring to FIG. 3, a thermal recording head 26 is used for heating selected areas of the thermal recording layer 20 of the display panel 10. The recording head 26 makes contact with the transparent protective layer 22 on the thermal recording layer 20 and can be moved on the surface of the protective layer 22. The motion and heating function of the recording head 26 are controlled by a recording head controller 28 to which data of a color image is supplied.

Figure 5:
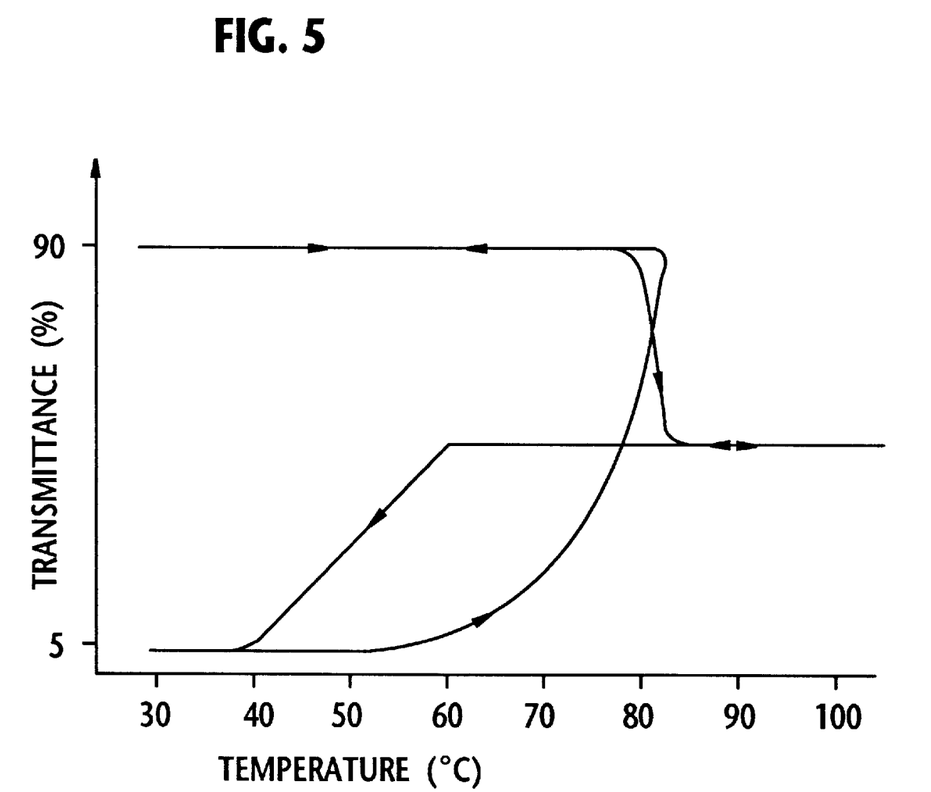
FIG. 5 is a chart showing reversible changes in transmittance of a thermal recording material used in this invention with temperature.

Initially the thermal recording layer 20 is very low in transmittance over the entire area so that the display panel 10 as a whole is practically opaque. With respect to the aforementioned example of the material of the thermal recording layer 20, FIG. 5 shows the manner of reversible changes in transmittance with temperature. This material becomes very high in transmittance when heated to about 83° C. and retains the high transmittance even though the temperature lowers from about 83° C. However, when the material in the high-transmittance state is heated to near to 100° C. the transmittance lowers to a medium level, and by subsequent lowering of temperature the transmittance lowers from the medium level to the initial low level.

According to the data of the color image to be displayed, the thermal recording head 26 scans the recording layer 20 (through the transparent protective layer 22) to heat the recording layer 20 to about 83° C. only in selected areas each of which is opposite to one of the color areas R, G, B of the color pattern 14. Then the selectively heated areas of the recording layer 20 become very high in transmittance. For simplicity, FIG. 3 (wherein arrow M represents the motion of the recording head 26) illustrates that the transmittance of the recording layer 20 has become very high in areas opposite to the green color areas G but remains at the initial low level in areas opposite to the red and blue color areas R, B.

Figure 4:
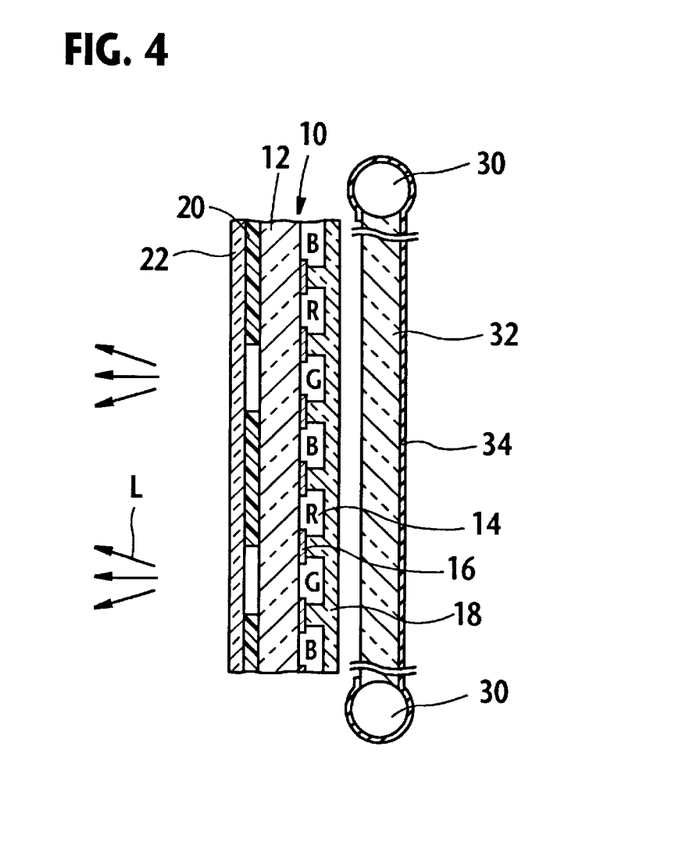

After that, the display panel 10 is illuminated from the back side on which the color pattern layer 14 exists. The backlight source can be selected, for example, from incandescent lamps, fluorescent lamps including panel lamps, light-emitting diodes and electroluminescent lamps. FIG. 4 shows the use of fluorescent lamps 30 (of cold-cathode type) for backlighting. Two fluorescent lamps 30 are arranged along two opposite ends of the display panel 10, and a transparent plate 32 of methacrylate resin is used as a light transmitting medium. The lamps 30 and the light transmitting plate 32 are covered with a reflector 34 to prevent leakage of light. To enhance the efficiency and uniformity of backlighting, it is optional to afford the light transmitting plate 32 with a light diffusing capability or to use Fresnel prism or a set of thin transparent plates. As the backlighted display panel 10 is viewed from the front side on which the recording layer 20 exists, an image in green color appears in the display panel since the illuminating light passes through the recording layer 20, as indicated by arrows L, only in areas opposite to the green color areas G.

In this example the display panel 10 is illuminated from the back side on which the color pattern layer 14 exists. That is, the light source is placed relatively close to the color pattern layer 14. Therefore, when the display panel is viewed from the opposite side, light transmitted through the color areas over the low-transmittance areas of the recording layer 20 is almost invisible, and hence a very clear color image appears.

If temporary disappearance of the displayed color image is desired, it suffices to simply turn off the backlight. To completely erase the color image in preparation for the display of another color image, the high-transmittance areas of the thermal recording layer are temporarily heated to a suitable temperature, about 100° C. in this example, by operating the recording head 26 and thereafter allowed to cool down. In the heat-treated areas the high transmittance reverts to the initial low level as described above with reference to FIG. 5. In consequence the recording layer 20 has the initial low transmittance over the whole area. It is also possible to display a new image by partly utilizing the high-transmittance and low-transmittance pattern in the recording layer 20 for the last displayed image. In that case, the transmittance of the recording layer 20 is changed according to the data of the new image only in areas where the transmittance pattern for the last image does not accord with a new transmittance pattern for the new image.

In the above described example the transmittance of the thermal recording layer 20 in selected areas is changed between two levels for transmitting or shielding the illuminating light, but this is not limitative. It is possible to use a thermal recording material that exhibits multistage changes in transmittance with temperature in order to display color images with much gradations.

The material of the thermal recording layer 20 is not necessarily a mixture of a fatty acid and a thermoplastic resin. Further selection can be made from polymer liquid crystals and polymer blends.

Figure 6:
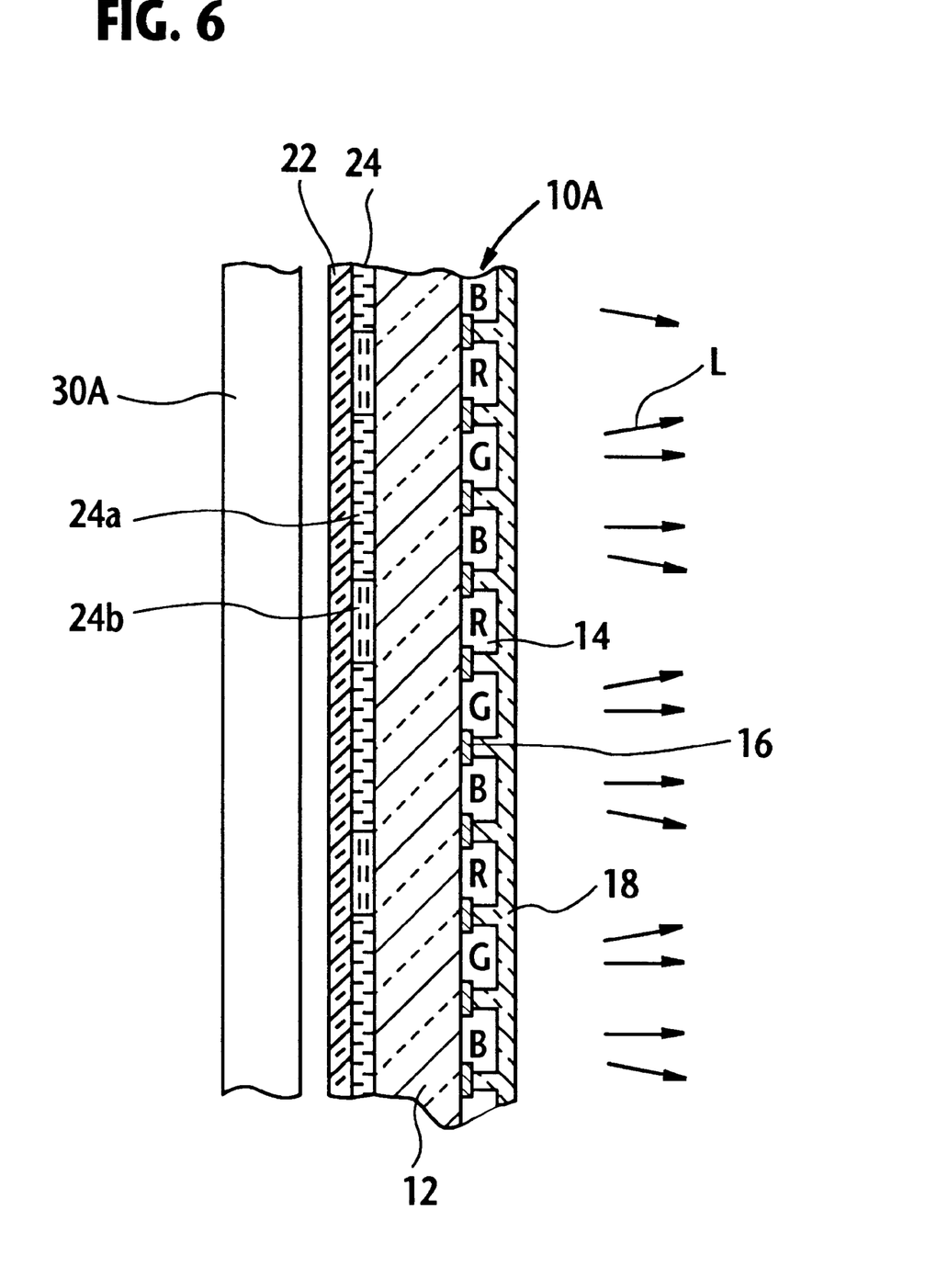
FIG. 6 illustrates, in a sectional view, displaying a color image on an another display panel according to the invention.

FIG. 6 shows another display panel 10A according to the invention. This display panel 10A is analogous to the panel 10 of FIG. 1 in having a transparent color pattern layer 14 on one side of a transparent glass substrate 12. On the opposite side of the substrate 12 there is a magnetic recording layer 24 in place of the thermal recording layer 20 in FIG. 1. The color pattern layer is overlaid with a transparent protective layer 18 and the recording layer 24 with another transparent protective layer 22.

The magnetic recording layer 24 is formed of a magnetic material that exhibits reversible changes in transmittance by application of magnetic fields. The magnetic material contains flaky particles (relatively large in length-to-width ratio) of a ferromagnetic metal such as, for example, Fe, Ni, Fe-Ni or Fe-Ni-Cr. In a preferred example, flaky magnetic metal particles shorter than about 10 μm are confined in microcapsules. For example, the metal particles are dispersed in an ethyl cellulose solution and the particles in the solution are encapsulated by using gelatin as the capsule material to obtain magnetic microcapsules having a mean diameter of 40 to 80 μm. The magnetic microcapsules are dispersed in poly(vinyl alcohol) (PVA), and the dispersion is coated on the glass substrate 12 to form the magnetic recording layer 24. In this case it is suitable to use PVA as the material of the transparent protective layer 22. However, the use of microcapsules is not a requisite. It is optional to form the magnetic recording layer 24 by application of a dispersion of flaky magnetic metal particles in PVA or an alternative polymer.

The flaky metal particles in the magnetic recording layer 24 can be oriented parallel to or perpendicular to the substrate 12 by application of a horizontal magnetic field (parallel to the substrate 12) or a vertical magnetic field (perpendicular to the substrate). When the flaky particles are oriented parallel to the substrate 12, the recording layer 24 is reflective and is very low in transmittance for light perpendicularly incident on the display panel 10A. When the flaky particles are oriented perpendicular to the substrate 12, the recording layer 24 is high in transmittance for the incident light. Optionally the reflectivity of the flaky metal particles may be augmented by coating the surface of the individual particles with a suitable metal such as Al or Ag by using a vapor deposition technique.

A color image is displayed on the display panel 10A in the following way, assuming that initially the flaky metal particles in the whole area of the recording layer 24 are oriented parallel to the substrate 12.

According to the data of the color image to be displayed, a vertical magnetic field is applied to the recording layer 24 through the protective layer 22 in selected areas each of which is opposite to one of the color areas R, G, B of the transparent color pattern layer 14. For this purpose a magnetic recording head (not shown) is used in place of the thermal head 26 in FIG. 3. According to the need the magnetic head may be provided with a counter head on the opposite side of the display panel. For simplicity, FIG. 6 shows that the vertical magnetic field is applied in areas 24a opposite to the green and blue color areas G, B. As a result the flaky metal particles in the areas 24a are oriented perpendicular to the substrate 12, but the flaky metal particles in areas 24b opposite to the red color areas R remain parallel to the substrate 12.

After that the display panel 10A is illuminated by a backlight source 30A from the side on which the recording layer 24 exists. In FIG. 6 the backlight source 30A is assumed to be an electroluminescent panel lamp which emits white light. The illuminating light passes through the areas 24a of the recording layer 24 and the green and blue color areas G, B of the color pattern layer 14 as indicated by arrows L, but the light does not reach the red color areas R because the opposite areas 24b of the recording layer 24 remain reflective. So, viewing the display panel 10A from the side on which the color pattern layer 14 exists, an image in cyan color appears as a color mixture of green and blue. In this case the display panel 10A is illuminated from the side on which the recording layer 24 exists because the low-transmittance areas 24b of the recording layer 24 are reflective.

The displayed color image can be erased by applying a horizontal magnetic field to the whole area of the magnetic recording layer 24. Alternatively, to display a new color image the orientation of the flaky metal particles may be changed, according to the data of the new image, only in areas where the orientation pattern for the last image does not accord with a new orientation pattern for the new image.

In the daytime it is possible to use the display panel 10A of FIG. 6 without using the backlight 30A. In that case the color of the displayed image is complementary to the color of the image displayed by using the backlight 30A. That is, an image in red color appears when the magnetic recording layer 24 is in the state illustrated in FIG. 6. An image in cyan color appears if a horizontal magnetic field is applied to the areas 24a of the recording layer 24 and a vertical magnetic field to the areas 24b.

As a modification of the display panel 10A of FIG. 6, it is possible to form the color pattern layer 14 and the magnetic recording layer 24 on the same side of the substrate 12. In that case, the recording layer 24 underlies the color pattern layer 14.

Figure 7:
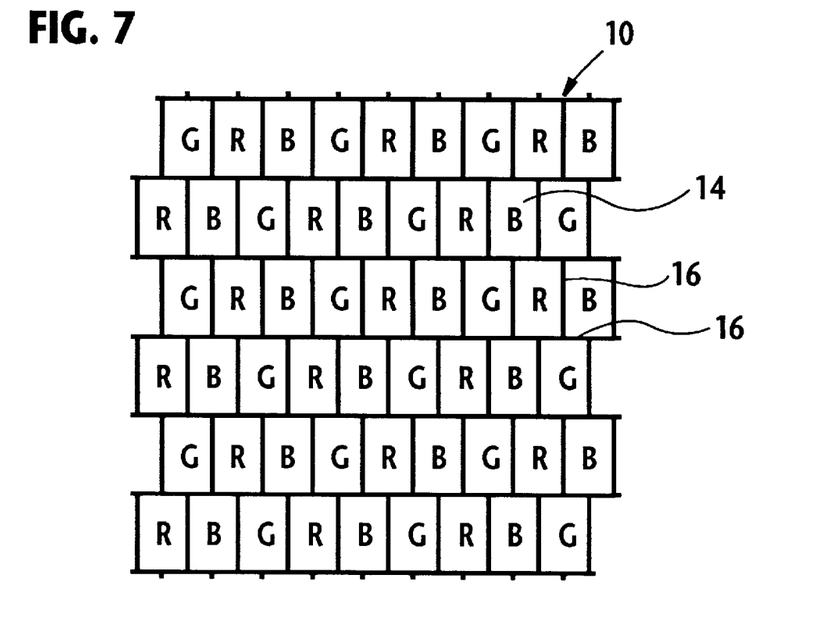
FIGS. 7 to 9 show three other examples of color patterns in the display panel of FIG. 1 or FIG. 6.
Figure 8:
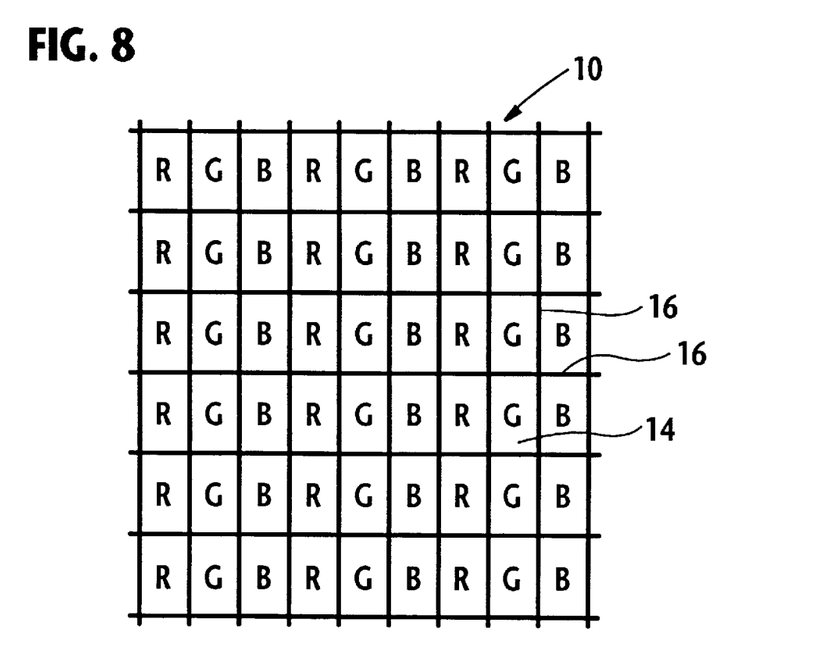
Figure 9:
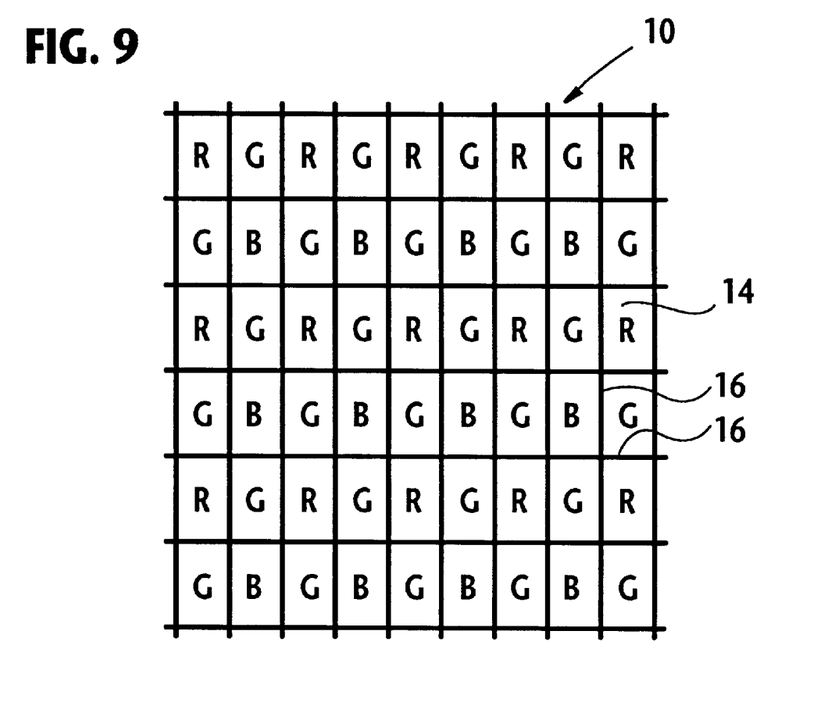

FIGS. 7, 8 and 9 show three different examples of the pattern of three primary color areas R, G, B in a display panel according to the invention, either 10 in FIG. 1 or 10A in FIG. 6. In FIG. 7 the color areas R, G, B are arranged in a regularly repetitive triangular pattern. In the pattern of FIG. 8 the three kinds of color areas R, G and B respectively constitute stripes. In the pattern of FIG. 9, two color areas (R and G, or G and B) are alternately arranged in each row and each file. It is possible to employ a still different pattern. Furthermore, it is optional to employ a combination of three colors other than the combination of red, green and blue, though the combination of the three primary colors is suited to the display of full color images. It is also possible to employ a combination of two colors or more than three colors.

Figure 10:
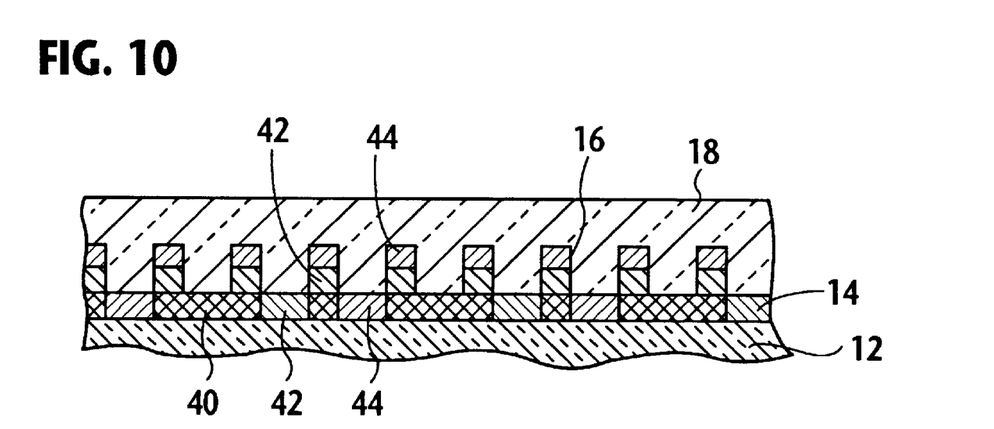
FIG. 10 illustrates, in a sectional view, a modified way of forming a color pattern layer of a display panel used in the invention.

FIG. 10 illustrates another method of forming the black lines 16 in the color pattern layer 14 in FIG. 1 or FIG. 6. First a transparent red color layer 40 is selectively formed in areas to become the red color areas R and in narrow areas assigned to the black lines 16. Next, a transparent green color layer 42 is selectively formed in areas to become the green color areas G and also on the red color layer 40 in the areas assigned to the black lines 16. Next, a transparent blue color layer 44 is formed in areas to become the blue color areas B and also on the green color layer 42 in areas assigned to the black lines 16. The super-position of the red, green and blue layers 40, 42, 44 gives an opaque, black coating (16). In this case it is suitable to form the red, green and blue layers 40, 42, 44 by a printing method.

What is claimed is:

1. A method of displaying a color image on a display panel, the method comprising:

using a display panel having a transparent substrate, a color pattern layer which is formed on one side of the substrate and has a multiplicity of transparent pixel areas consisting of at least two separate sets of pixel areas in different colors which constitute a repetitive pattern and a set of repetitively arranged opaque areas by which each of the pixel areas is bordered, and a recording layer which is formed on the substrate to lie parallel to the color pattern layer and is formed of a recording material which exhibits reversible changes in transmittance by application of external stimulus;

selectively applying an external stimulus to the recording layer of the display panel to change the transmittance of the recording layer in areas opposite to selected pixel areas of the color pattern layer; and backlighting the display from a selected side.

2. A method according to claim 1, wherein said recording material is a thermal recording material which exhibits reversible changes in transmittance with temperature, said external stimulus being heat.

3. A method according to claim 1, wherein said recording material is a magnetic recording material, said external stimulus being a magnetic field.

4. A method according to claim 3, wherein said magnetic recording material comprises flaky particles of a ferromagnetic metal dispersed in a transparent polymer, said magnetic field being in such a direction that said flaky particles in said areas are oriented in a direction selected from a first direction which is parallel to said substrate and a second direction which is perpendicular to said substrate.

5. A method of displaying a color image on a display panel, the method comprising:

using a display panel having a transparent substrate, a color pattern layer which is formed on one side of the substrate and has a multiplicity of transparent pixel areas consisting of at least two separate sets of pixel areas in different colors which constitute a repetitive pattern and a set of repetitively arranged opaque areas by which each of the pixel areas is bordered, and a thermal recording layer which is formed on the opposite side of the substrate and is formed of a thermal recording material which exhibits reversible changes in transmittance with temperature;

selectively heating the thermal recording layer to change the transmittance of the recording layer in areas opposite to selected pixel areas of the color pattern layer; and backlighting the display panel from the side on which the color pattern layer exists.

6. A method according to claim 5, wherein said thermal recording material comprises a mixture of a fatty acid and a thermoplastic resin.

7. A method according to claim 5, wherein said thermal recording material comprises a polymer liquid crystal.

8. A method according to claim 5, wherein said thermal recording material comprises a polymer blend.

9. A method according to claim 5, wherein the color pattern layer has three separate sets of pixel areas which are in red, green and blue colors, respectively.

10. A method according to claim 5, wherein all the pixel areas are rectangular areas.

11. A method according to claim 5, wherein said opaque, areas are black areas.

12. A method of displaying a color image on a display panel, the method comprising:

using a display panel having a transparent substrate, a color pattern layer which is formed on one side of the substrate and has a multiplicity of transparent pixel areas consisting of at least two separate sets of pixel areas in different colors which constitute a repetitive pattern and a set of repetitively arranged opaque areas by which each of the pixel areas is bordered, and a magnetic recording layer which is formed on the substrate to lie parallel to the color pattern layer and is formed of a magnetic recording material comprising flaky particles of a ferromagnetic metal dispersed in a transparent polymer;

orienting said flaky particles in the magnetic recording layer in a first direction which is parallel to the substrate or in a second direction which is perpendicular to the substrate;

selectively applying a magnetic field to the magnetic recording layer to change the orientation of said flaky particles to one of said first and second directions in areas opposite to selected pixel areas of the color pattern layer; and backlighting the display panel from the side on which the color pattern layer exists.

13. A method according to claim 12, wherein said flaky particles are confined in microcapsules of an organic material.

14. A method according to claim 12, wherein said color pattern layer and said magnetic recording layer are formed on the opposite sides of the substrate, respectively.

15. A method according to claim 12, wherein the color pattern layer has three separate sets of pixel areas which are in red, green and blue colors, respectively.

16. A method according to claim 12, wherein all the pixel areas are rectangular areas.

17. A method according to claim 12, wherein said opaque, areas are black areas.

* * * * *